July 16, 1968
J. C. CATHCART
3,392,414
EGG CLEANING APPARATUS
Filed March 21, 1966
2 Sheets-Sheet 1
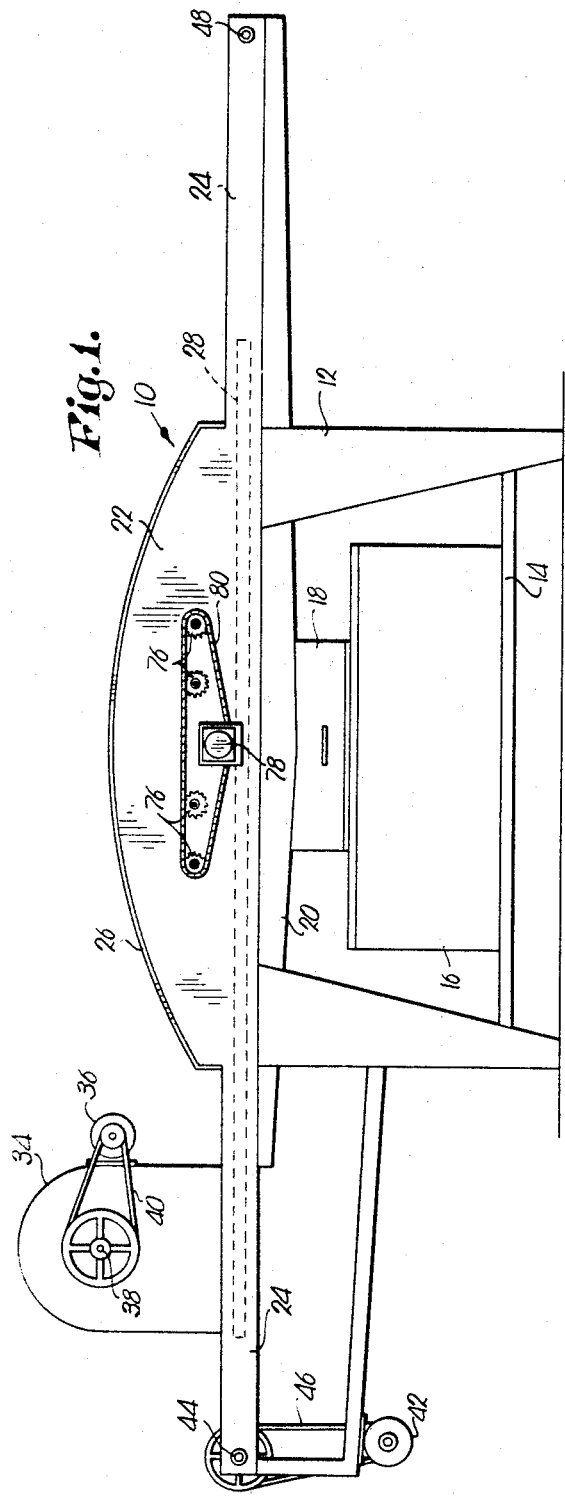
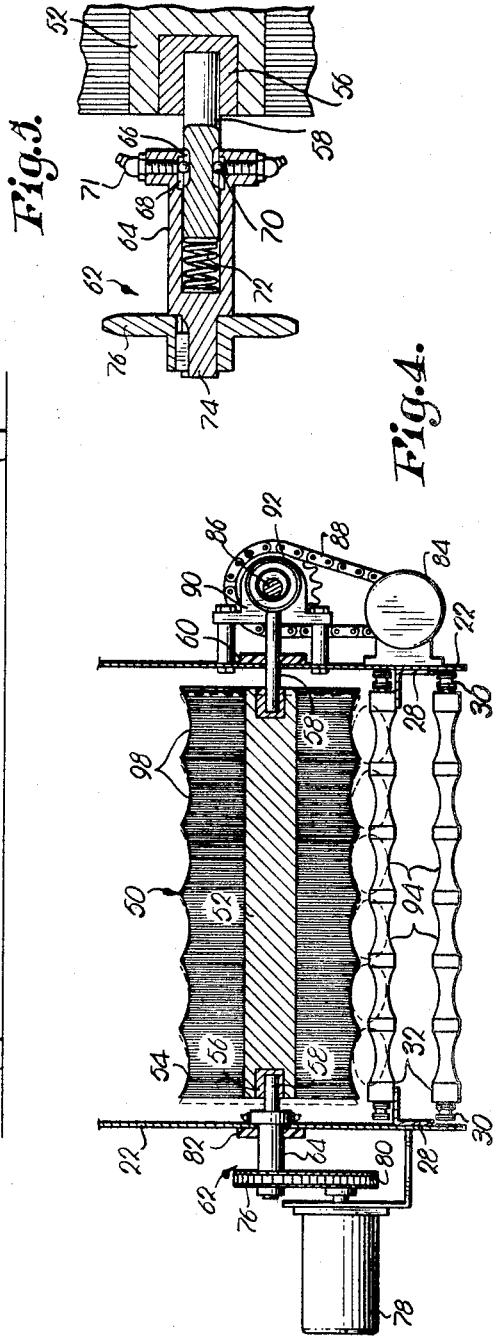
INVENTOR
John C. Cathcart
BY
*Hovey, Schmidt, Johnson & Hovey*
ATTORNEYS.

July 16, 1968  J. C. CATHCART  3,392,414
EGG CLEANING APPARATUS
Filed March 21, 1966  2 Sheets-Sheet 2

INVENTOR
John C. Cathcart
BY
ATTORNEYS.

United States Patent Office 3,392,414
Patented July 16, 1968

3,392,414
EGG CLEANING APPARATUS
John C. Cathcart, Topeka, Kans.
(R.R. 1, Wilsey, Kans. 66873)
Filed Mar. 21, 1966, Ser. No. 535,810
14 Claims. (Cl. 15—3.13)

ABSTRACT OF THE DISCLOSURE

An automatic egg cleaning machine employs a conveyor which transports the eggs beneath a row of rotary brushes of generally cylindrical configuration, each brush having annular depressions spaced along its length and aligned with egg-receiving recesses in the rollers of the conveyor passing therebeneath. A two-way scrubbing action is obtained by the rotation of the brushes about their axes, the latter extending horizontally in transverse relationship to the path of movement of the conveyor, and by reciprocating each brush along its axis back-and-forth across the eggs therebeneath. Additionally, the axes of the brushes are disposed eccentrically with respect to the scrubbing surfaces thereof to provide up-and-down movement of the brushes so that pressure on the eggs is released during each brush revolution to permit the eggs to turn more freely during the scrubbing operation.

---

This invention relates to improvements in apparatus for cleaning eggs prior to packaging.

Automatic egg cleaning machines commonly employ a conveyor which transports the eggs through a pair of treating stations. The first station washes and rinses the eggs as they pass therethrough; subsequently, the second station evaporates residual rinse water remaining on the eggs, normally through the use of heated forced air.

In the washing and rinsing station, it has been the practice to employ a plurality of rotary brushes which scrub the eggs as detergent and hot water are applied. Such brushes are cylindrical in configuration and are rotated about their longitudinal axes in a manner to continuously engage the brushing surfaces thereof with the eggs under treatment. Although this technique has proven satisfactory, the efficiency of the cleaning operation is severely limited in that the bristles sweep the eggs in one direction only; additionally, the cylindrical brush contour provides maximum scrubbing contact with each egg only at the central, large diameter portion thereof.

It is, therefore, an object of this invention to provide a rotary cleaning element for an egg cleaning machine capable of frictionally engaging and scrubbing substantially the entire surface of each egg as the latter is advanced by the egg-transporting conveyor of the machine.

Another object of the instant invention is to provide a rotary cleaning element for an egg cleaning machine which is movable toward and away from the egg-transporting conveyor to repeatedly release and reapply scrubbing pressure to the eggs, thereby permitting the eggs to turn more freely as they are cleaned.

Another object is to provide a cleaning element for an egg cleaning machine of the type discussed above which is operated by reciprocating the element transversely of the path of travel of the eggs at a relatively high cyclic rate in order to obtain an improved scrubbing action.

Furthermore, it is an object of the invention to provide a rotary cleaning element for an egg cleaning machine which is movable longitudinally of its axis of rotation to effect scrubbing of the eggs by a 2-way action.

Additionally, it is an object of this invention to provide a cleaning element as aforesaid wherein greater surface coverage is attained by the provision of radially inwardly extending, egg-receiving depressions in the element, and wherein the element utilizes a combination of the above-mentioned rotary and translational movements to provide a highly superior cleaning effect.

A further object is to provide an egg-transporting conveyor for use in conjunction with cleaning elements having the aforesaid egg-receiving depressions therein wherein such conveyor employs rollers having egg-receiving recesses therein which move into opposed relationship to the depressions in the elements as the conveyor is advanced through the cleaning station of the machine, whereby the eggs are held against lateral movement during the scrubbing operation but permitted to revolve ot assure that the entire surface of each egg will be subjected to the scrubbing action.

Still another object is to provide a cleaning element as aforesaid in the form of a rotary brush of generally cylindrical configuration having a cleaning surface provided with a number of annular, egg-receiving depressions spaced longitudinally of the brush and adapted to frictionally engage substantially the entire surface of each egg received therein as the eggs revolve during the scrubbing operation.

Yet another object is to provide an egg washing station for an egg cleaning machine having a plurality of rotary brushes therein, means for introducing water and detergent to the brushes, and means coupled with each brush for rotating the latter about an eccentric axis and simultaneously reciprocating each brush longitudinally of such axis.

In the drawings:

FIGURE 1 is a side elevational view of an egg cleaning machine;

FIG. 4 is a vertical, sectional view taken along line 4—4 of FIG. 3; and

FIG. 5 is a cross-sectional detail of one of the brush axles and associated mounting means.

Figure 2:
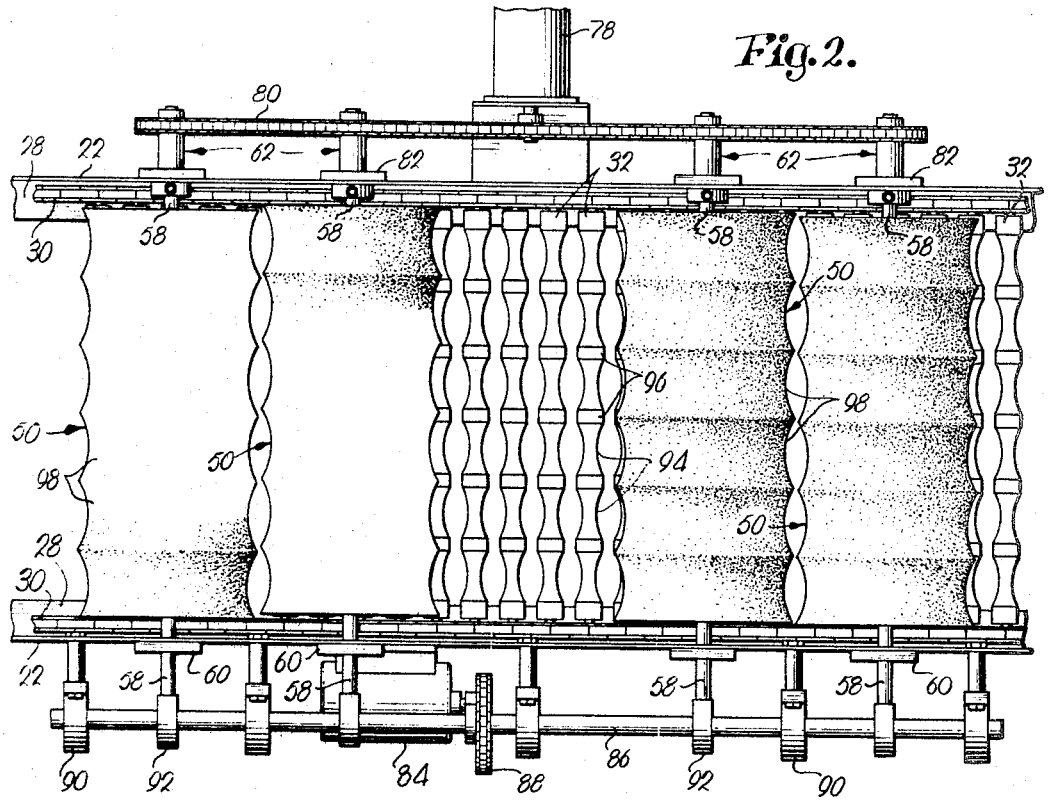
FIG. 2 is a plan view of the washing station with the hood thereof and the water sprayers removed to reveal the rotary cleaning brushes in detail.

An egg cleaning machine 10 is provided with a central stand 12 having a lower platform 14 supporting a water tank 16. A filter 18 is mounted on tank 16 between the latter and a catch basin 20. Side guards in the form of a pair of vertical panels 22 are supported by stand 12 and each includes a pair of opposed, elongated side plates 24 which extend longitudinally of machine 10 (FIG. 1). A removable hood 26 is normally seated on the upper edges of panels 22 and serves as a shield for the washing station components to be described hereinafter.

Panels 22 and their plates 24 serve as supports for a pair of elongated channel members 28 which form a track for the egg-transporting conveyor. The conveyor includes a pair of endless conveyor chains 30 which overlie the horizontal flanges of respective members 28 and carry a number of elongated, closely spaced, egg-receiving rollers 32. The cylindrical end portions of each roller 32 are in overlying engagement with respective members 30 to thereby cause the rollers to revolve as they are advanced along the conveyor track.

The top egg-bearing stretch of the conveyor moves from right to left as viewed in FIG. 1 but is hidden in this figure by panel 22 and plates 24. A forced air dryer 34 is disposed between hood 26 and the left end of the machine and directs air, preferably after heating thereof, vertically downwardly between the conveyor rollers 32. The blower (not shown) of dryer 34 is driven by a motor 36 which is coupled with the blower drive shaft 38 by a belt and pulley assembly 40. The conveyor extends throughout the entire length of machine 10 and is driven by a motor 42 coupled with a conveyor drive shaft 44 by a belt and pulley assembly 46. Conveyor chains 30 are trained around a pair of sprockets (not shown) keyed to shaft 44. The opposite end of the conveyor is supported by an idler shaft 48 at the right end of machine 10, shaft 48 also being provided with sprockets (not shown) which engage conveyor chains 30.

Four cleaning elements 50 in the form of rotary brushes of generally cylindrical configuration are mounted beneath hood 26 for rotation about axes extending at right angles to the path of travel of conveyor rollers 32. Each brush 50 has a central, cylindrical core 52 and is provided with a multitude of flexible, nylon bristles 54 which extend radially outwardly from core 52. Each end of core 52 is bored to receive a cylindrical insert 56 held therein by a press fit. An axle 58 is rigid with insert 56 and extends therefrom to define the axis of rotation of brush 50 in cooperation with the axle 58 projecting from the opposite end of core 52. It should be noted that axles 58 of each brush 50 are disposed in eccentric relationship to the longitudinal axis of the cylinder defined by core 52. Bristles 54, at a given cross-sectional plane through brush 50, are of equal lengths; therefore, the outer surface of brush 50 defined by the free ends of the bristles revolves about an eccentric axis when the brush is rotated.

Referring to FIG. 4, it may be seen that the right-hand panel 22 is apertured to receive the corresponding axle 58 and is provided with a bushing 60 which supports the axle for rotational movement about its axis and translational movement longitudinally of such axis.

The opposite axle 58 is journalled in a bearing assembly 62 having a sleeve portion 64 extending through the left-hand panel 22 (FIG. 4). Axle 58 extends into sleeve 64 and is provided with a pair of opposed, longitudinally extending slots 66 registering with opposed internal slots 68 in the inner end of sleeve 64. A pair of ball detents 70 are received in respective slots 66, 68 and prevent rotation of axle 58 with respect to sleeve 64; the detents are lubricated through a pair of radially extending nipples 71 communicating with respective slots 68. Slots 66, 68 permit longitudinal shifting of axle 58 with respect to the sleeve however, under the action of a coil spring 72 disposed between the end of the axle and the closed end 74 of sleeve 64. A sprocket 76 is keyed to end 74 and is driven by a motor 78 via chain 80, sleeve 64 being rotatably carried by a bushing 82. The mounting of all of the brushes 50 is achieved in the same manner; in FIG. 1 it may be seen that the four sprockets 76 of the four brushes 50 are driven in unison by chain 80.

The right-hand panel 22 (as viewed in FIG. 4) mounts a motor 84 which is coupled with a shaft 86 by a chain and sprocket assembly 88. Shaft 86 is carried by a number of journals 90 and is provided with four circular cams 92 in the form of ball bearing assemblies rigidly secured to the shaft in eccentric relationship to the axis thereof, as is clear in FIG. 4. The outer race of each bearing assembly is in engagement with the outer end of a corresponding axle 58.

Each of the conveyor rollers 32 has six radially inwardly extending recesses 94 therein spaced along the length thereof. As is clear in FIGS. 2 and 4, the recesses 94 are concave and conform approximately to the shape of an egg. Each adjacent pair of recesses 94 is separated by a cylindrical section 96 of the roller; thus, the eggs are arranged on the conveyor to form six rows extending in the direction of conveyor travel. Adjacent rollers are in sufficiently closely spaced relationship to one another to support one egg between each adjacent pair of recesses 94.

Each of the brushes 50 has six radially inwardly extending, annular depressions 98 therein spaced along the length thereof and corresponding to the six rows of eggs transported by the conveyor. FIGURES 2 and 4 reveal that each depression 98 extends continuously around the brush to form a circumferential zone, the depression being of transversely arcuate, concave configuration approximately complemental to the surface of an egg. Thus, the surfaces of the brushes appear scalloped in configuration because of the presence of depressions 98. It should be noted that the various depressions 98 are disposed in opposed relationship to the recesses 94 of the rollers 32 passing therebeneath.

Water and detergent are introduced to the brushes by a spray system which is arranged with tank 16, filter 18, and basin 20 to form a continuous flow path for the water and the detergent. The spray system includes a supply conduit 100 (FIG. 3) above brushes 50 provided with a plurality of spray heads 102 which are disposed to direct water and detergent downwardly into the brushes and toward the conveyor. Although only one head 102 is visible in FIG. 3, it is preferred that a row of spray heads be disposed in parallelism with the axis of the associated brush 50 to assure uniform distribution of water over the surface of the brush.

Figure 3:
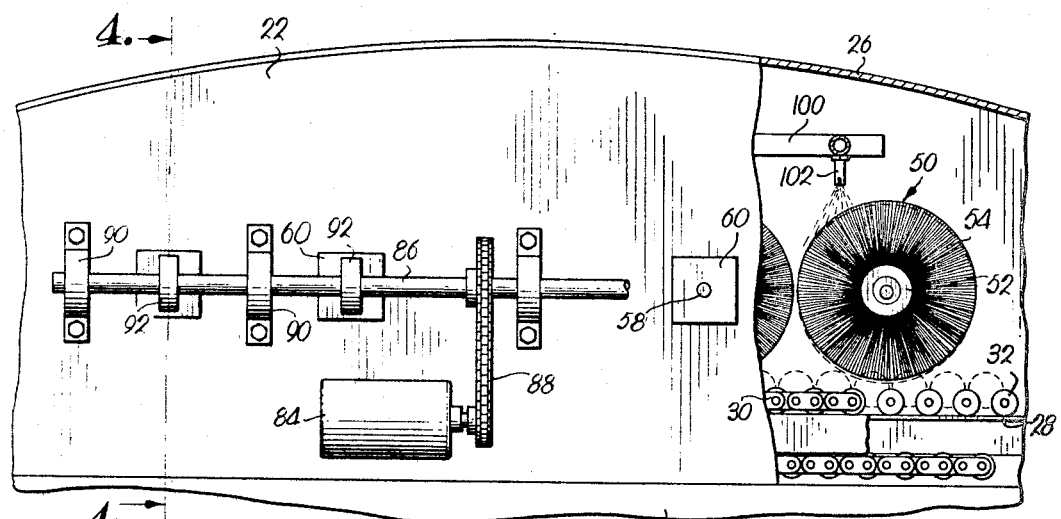
FIG. 3 is a side elevational view of the washing station looking oppositely from the view of FIG. 1, the hood being broken away to reveal details of construction.

In operation, eggs are loaded by hand or by automatic means onto the conveyor at the right end thereof as viewed in FIG. 1. Motors 78 and 84, as well as conveyor motor 42, are placed in operation, together with the recirculatory water and detergent supply system. It should be understood that tank 16, filter 18, and the sprayer are components of a conventional recirculatory water and detergent supply system utilized in machines of this type. Commonly, the water in tank 16 is heated and then pumped to the sprayer for discharge onto the brushes as illustrated in FIG. 3; detergent is introduced into the system if desired. The wash water passes over the eggs and into basin 20 where it drains into filter 18 for reuse in tank 16.

Motor 78 and its associated drive linkage cause brushes 50 to rotate about their eccentric axes, while motor 84 effects reciprocation of the brushes along respective axes of rotation by the action of cams 92 and springs 72. Since detents 70 permit longitudinal movement of axles 58, the high side of cams 92 shifts brushes 50 leftwardly (as viewed in FIG. 4), thereby compressing springs 72 within sleeves 64. As the cams continue to rotate, it will be appreciated that springs 72 shift brushes 50 rightwardly, thereby causing a back-and-forth or reciprocal motion to be imparted to the brushes. Brush 50 illustrated in FIG. 4 is shown at its right-hand limit of movement under the action of the associated spring 72; the limit of movement in the opposite direction is illustrated by the broken lines.

Since the axes of the brushes are eccentric, a vertical motion of the surfaces of the brushes will be produced during rotation. This action may be visualized in FIG. 3 by comparing the full-line and broken-line illustrations of the brush 50 there shown in full. It will be appreciated, therefore, that three independent motions are imparted to the brushes by operation of motors 78 and 84. The direction of rotation of the brushes is not critical, but it is preferred that they be rotated in opposition to the direction of conveyor movement, i.e., clockwise as viewed in FIG. 3. The speed of rotation of the brush should be relatively slow, on the order of 5 to 10 r.p.m., while the speed of reciprocation is preferably higher (600 reciprocal cycles per minute for example).

As the eggs (outlined in broken lines in FIGS. 3 and 4) move beneath brushes 50, the eggs are caused to revolve by the joint action of the rotating rollers and the rotating brushes. Thus, all sides of the egg surface are exposed to the brush bristles. Brush rotation is also effective in producing a scrubbing action and, additionally, in conjunction with spray heads 102, constantly brings clean water and a clean brush surface to bear against the eggs.

The primary scrubbing action is effected by the translational reciprocation of the brushes. The reciprocal movement, as suggested above, may be sufficiently rapid to effect a translational vibration of the brushes, although it is to be understood that the speeds set forth above for the reciprocal and the rotational movements are not critical to operability.

The up-and-down movement of the brushes, effected by the eccentric location of the axes of rotation thereof, causes the brushes to release pressure on the eggs during each revolution. This permits the eggs to turn more freely during the scrubbing operation to assure that all sides of the eggs will be exposed to the scrubbing bristles.

Finally, it is to be observed that the depressions 98 in the surfaces of the brushes assure that the ends of the bristles will contact the eggs along substantially the entire length of each egg. Furthermore, the concave configuration of the depressions serves to distribute the scrubbing force of the bristles more uniformly over the rounded egg surface than would be the case if the surface of each brush were of a true cylindrical configuration.

Having thus described the invention, what is claimed as new and desired to be secured by Letters Patent is:

1. In apparatus for cleaning eggs:
a conveyor for transporting said eggs along a predetermined path of travel,
a cleaning element,
means mounting said element adjacent said conveyor for rotation about an axis extending through said element transversely of said path, whereby the element presents an outer surface spaced from said axis,
said mounting means positioning said element for engagement of said surface with said eggs as the latter are transported along said path by the conveyor,
said surface having a radially inwardly extending depression for frictionally receiving the eggs between the element and the conveyor whereby, upon rotation of said element, the latter cleans the eggs by a rotary scrubbing action,
said element having a substantially circular configuration transversely of said axis,
said axis being disposed in eccentric relationship to said configuration, and
means coupled with said element for rotating the latter about said axis, whereby said surface moves toward and away from the conveyor as the element rotates to permit the eggs to turn more freely as the same are cleaned by the rotary scrubbing action.

2. The invention of claim 1,
said mounting means including structure mounting said element for reciprocal movement longitudinally of said axis, and
means coupled with said element for reciprocating the latter, whereby to provide a second scrubbing action.

3. In apparatus for cleaning eggs:
a conveyor for transporting said eggs along a predetermined path of travel,
a cleaning element having a substantially circular, cross-sectional configuration,
means mounting said element adjacent said conveyor for rotation about an axis extending through said element in eccentric relationship to said configuration, whereby the element presents an outer surface spaced from said axis,
said mounting means positioning said element with said axis extending transversely of said path and with said surface disposed for engagement with said eggs as the latter are transported along said path, and
means coupled with said element for rotating the latter about said axis, whereby said surface moves toward and away from the conveyor as the element rotates to permit the eggs to turn more freely as the same are cleaned by a rotary scrubbing action.

4. The invention of claim 3,
said mounting means including structure mounting said element for reciprocal movement longitudinally of said axis, and
means coupled with said element for reciprocating the latter, whereby to provide a second scrubbing action.

5. The invention of claim 4,
said reciprocating means being operable to reciprocate the element at a substantially higher cyclic rate than the rate of rotation thereof.

6. In apparatus for cleaning eggs:
a conveyor for transporting said eggs along a predetermined path of travel,
a rotary cleaning element having an outer scrubbing surface,
means mounting said element adjacent said conveyor with its rotative axis extending transversely of said path and for reciprocal movement of the element transversely of said path,
said mounting means positioning said element for engagement of said surface with said eggs as the latter are transported along said path, and
operating means coupled with said element for rotating and reciprocating the latter, whereby the element cleans the eggs by a two-way scrubbing action.

7. The invention of claim 6,
said surface having a radially inwardly extending depression for frictionally receiving the eggs between the element and the conveyor.

8. The invention of claim 7,
said element having a substantially circular configuration transversely of said axis,
said surface having a concave, annular zone surrounding said axis and presenting said depression.

9. The invention of claim 7,
said element having a substantially circular configuration transversely of said axis,
said conveyor including a plurality of elongated rollers, and means mounting said rollers for movement along said path with the longitudinal axes thereof extending transversely of said path,
said rollers being closely spaced and each having a radially inwardly extending, egg-receiving recess therein aligned with the recesses of the other rollers,
said element mounting means supporting said element above the rollers adjacent thereto, with said depression disposed in opposed relationship to the recesses of said adjacent rollers.

10. The invention of claim 7,
said element having a substantially circular configuration transversely of said axis,
said surface having a plurality of additional, radially inwardly extending depressions therein spaced longitudinally of said axis and spaced from the first mentioned depression,
said conveyor including a plurality of elongated rollers, and means mounting said rollers for movement along said path with the longitudinal axes thereof extending transversely of said path,
said rollers being closely spaced and each having a number of radially inwardly extending, egg-receiving recesses therein spaced longitudinally of the respective roller axis and aligned with the recesses of the other rollers,
said element mounting means supporting said element above the rollers adjacent thereto, with said depressions disposed in opposed relationship to corresponding recesses, whereby to frictionally receive a row of eggs between the element and the rollers as the latter pass beneath said element, and
means engaging said rollers, during movement of the same beneath said element, for rotating the rollers to assure that the eggs revolve during scrubbing thereof.

11. The invention of claim 6,
said mounting means including a pair of opposed axles rigid with said element, projecting therefrom, and defining said axis, and structure supporting said axles for rotation about said axis and for reciprocal movement therealong, said operating means including a rotatable cam engageable with one of said axles for shifting said one axle, and hence said element and the other axle, in one direction along said axis, yieldable means engaging said other axle and biasing the latter, and hence said one axle and said element, in the opposite direction along said axis, and drive means coupled with said cam for rotating the latter to cyclically shift said element in first said one direction and then said opposite direction by alternate action of said cam and said yieldable means.

12. The invention of claim 6, and a washing unit having a wash fluid discharging head disposed to direct said fluid onto said element and toward said conveyor, and means adjacent said conveyor for drying the eggs subsequent to washing and scrubbing thereof.

13. The invention of claim 6, said mounting means including structure mounting said element for said reciprocal movement thereof along said axis.

14. The invention of claim 13, said element comprising a generally cylindrical brush having a substantially circular configuration transversely of said axis, said brush having radially outwardly extending bristles presenting free ends defining said surface.

References Cited

UNITED STATES PATENTS

| | | | |
|---|---|---|---|
| 2,412,565 | 12/1946 | Davis | 15—3.15 |
| 2,673,361 | 3/1954 | McCutchan | 15—3.15 |
| 2,979,746 | 4/1961 | Willsey | 15—3.13 |
| 3,097,382 | 7/1963 | Angie | 15—3.13 |
| 3,099,848 | 8/1963 | Mountz | 15—3.14 |

EDWARD L. ROBERTS, *Primary Examiner.*